United States Patent [19]
Neuberger

[11] Patent Number: 6,011,890
[45] Date of Patent: Jan. 4, 2000

[54] HIGH POWER, MULTI-DIODE LASER SYSTEM

[75] Inventor: Wolfgang Neuberger, F. T. Labuan, Malaysia

[73] Assignee: Ceram Optec Industries, Inc., East Longmeadow, Mass.

[21] Appl. No.: 08/906,802

[22] Filed: Aug. 6, 1997

[51] Int. Cl.[7] ....................................... G02B 6/04
[52] U.S. Cl. ............................................... 385/121
[58] Field of Search ................... 372/50, 56, 9, 372/21, 6, 96, 97; 385/37, 49, 122, 14, 2, 8, 9, 24, 31, 45, 46, 130, 132; 359/115, 124, 127, 181, 188

[56] References Cited

U.S. PATENT DOCUMENTS

| | | | |
|---|---|---|---|
| 4,309,667 | 1/1982 | Firte et al. | 385/37 |
| 5,111,475 | 5/1992 | Ackerman et al. | 385/15 |
| 5,233,187 | 8/1993 | Sakata et al. | 385/37 |
| 5,394,489 | 2/1995 | Koch | 385/14 |
| 5,532,813 | 7/1996 | Ohishi et al. | 385/122 |

*Primary Examiner*—Akm E. Ullah
*Attorney, Agent, or Firm*—Bolesh J Skutnik; B J Associates

[57] ABSTRACT

The present invention teaches a diode laser system which utilizes optical fibers arranged in bundles whereby one group is bundled in a central section and one or more groups are arranged in a concentric circle or other symmetrical shape or configuration around the central bundle. Variable power ranges and power densities are transmitted from the different groups as required for a particular medical or industrial application. The effect is to deliver a focused output of power density in the desired range. Alternatively, the diode laser system can use sets of lenses, prisms, other optical elements to focus output from groups of diode laser emitters to a treatment site or treatment optical fiber as required for a particular medical or industrial application. The diode laser system may also be programmed to utilize varying bundles of fibers for less than maximum power output so as to maximize the overall usable lifetime of the system.

19 Claims, 3 Drawing Sheets

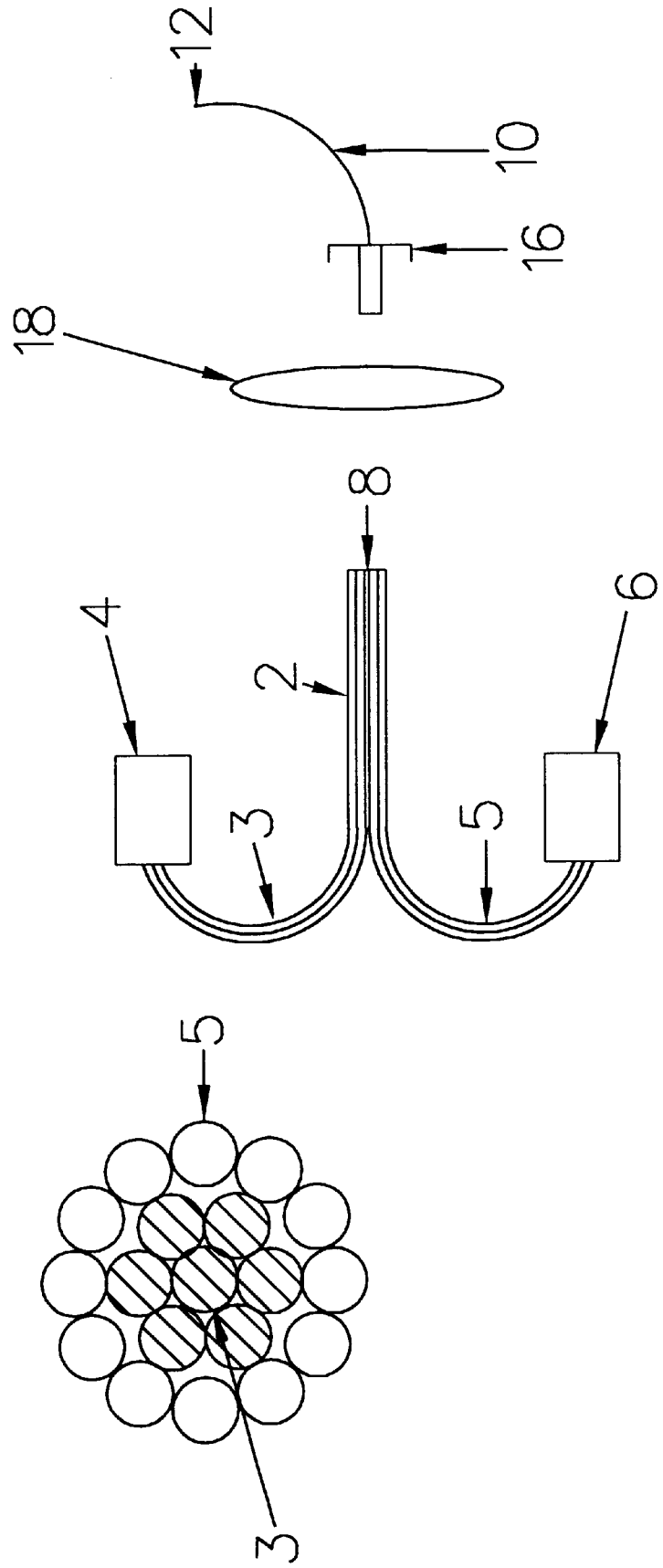

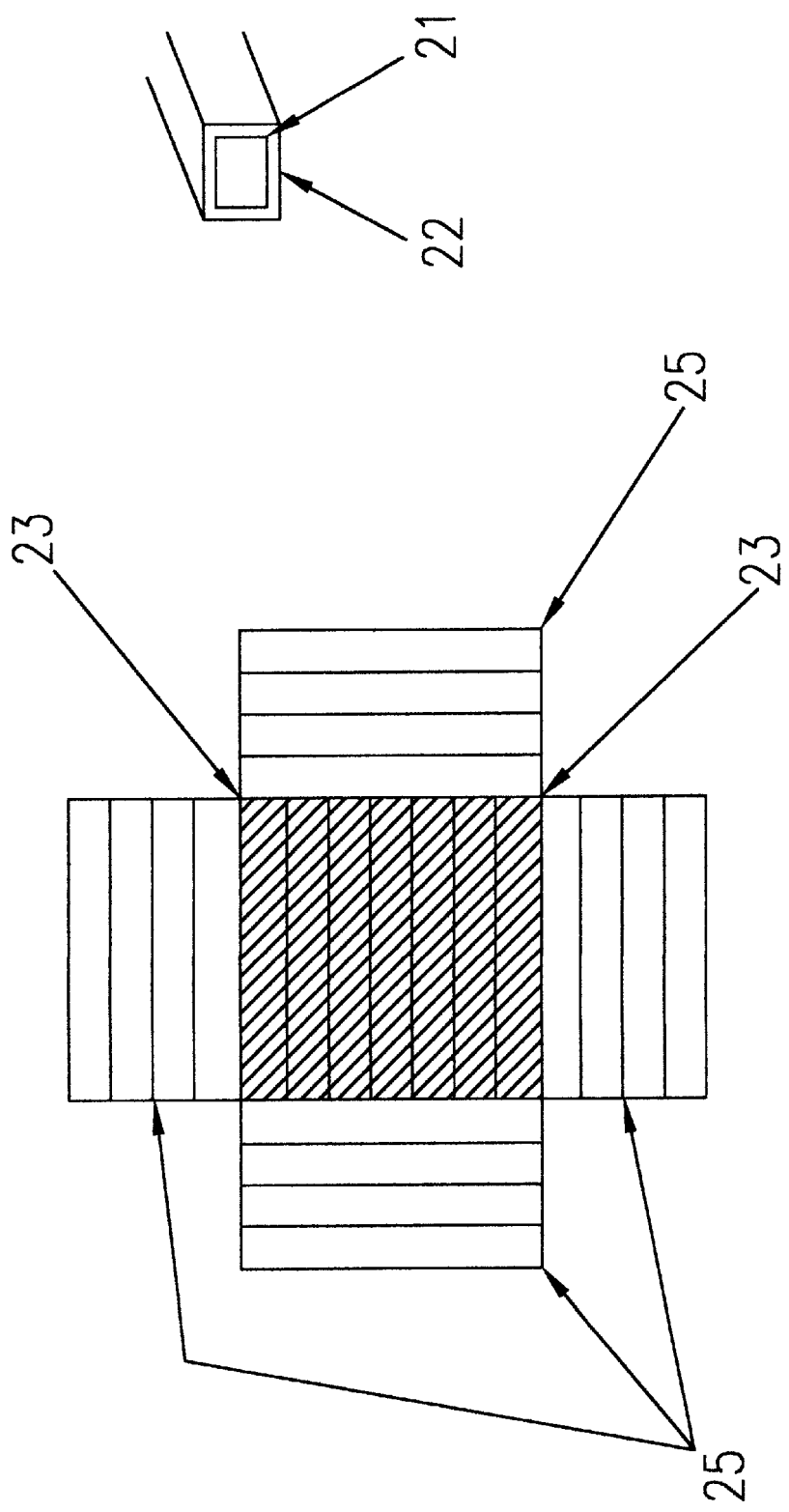

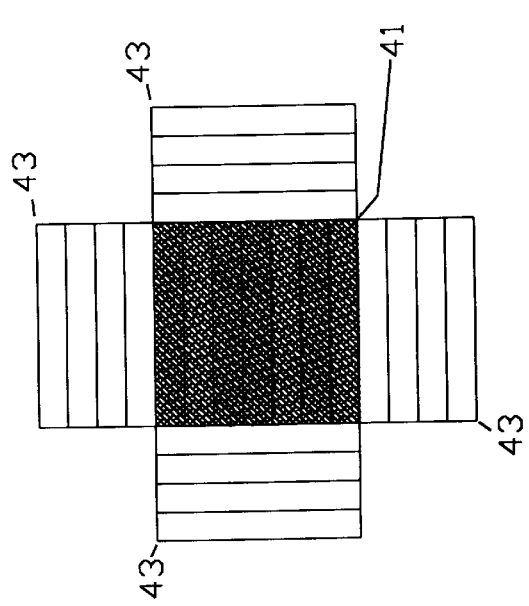
FIGURE 4
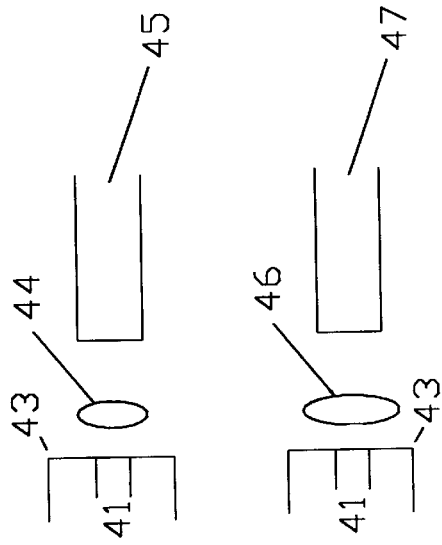
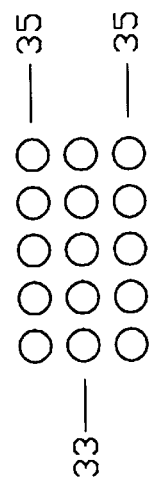
FIGURE 3

HIGH POWER, MULTI-DIODE LASER SYSTEM

BACKGROUND OF THE INVENTION

1. Field of the Invention

The present invention relates to laser systems composed of multiple diode laser sources which are combined to yield powerful laser beams for surgery and the like. In particular, it deals with diode laser systems useful in medical applications and industrial applications, which require high power densities.

2. Information Disclosure Statement

Primarily, two types of laser systems are currently available, classical laser systems and diode laser systems. Classical laser systems are bulky and often require articulated arms to deliver laser beams to desired locations. They can be well focused at lower power levels but the size of the output spot increases along with an increase in the output power usually due to thermal lensing.

Diode lasers have certain advantages over classical lasers, such as compact size, lower power consumption and lower maintenance costs. To maintain high power densities in the output beam, however, small diameter fiberoptic delivery systems should be used with lower power emitters whereas larger diameter fibers ordinarily must be used with higher power emitters. As a practical matter, therefore, it is difficult for one to focus the output spot from many small emitters into one fiber delivery system of a given core size. The basis for the difficulty is within the properties of classical optics. A bundle of fibers, 19 fibers, for example, of a given diameter has a certain overall diameter which can only be imaged onto another diameter following optical invariants. This is known as Streibel's Law: Diameter times Sin θ equals a numerical constant, where Sin θ is a measure of the divergence of the beam emitted by a source or at a fiber's end. Sin θ is also a measure of the maximum acceptance angle of a fiber, i.e. it is proportional to the numerical aperture (NA) of a fiber. The larger the diameter of the bundle the greater the restriction on the minimum size of the 'treatment' fiber delivering the radiation to the application site. It is impossible to achieve a smaller diameter within classical optics, then determined by Streiber's Law. Prior to the present invention, the output power of a diode laser system was controlled by the diode current. The diameter of a bundle, and hence the treatment fiber were determined by the number of diodes reaquired to achieve the desired maximum power for the system.

An ideal delivery system for many medical and industrial applications would be one which could operate with a wavelength of around 1 μm at between 60 to 100 watts of output power and which would be able to provide variable power and high power density by launching into delivery fiber cores ranging from 600 μm to as low as 200 μm core. No existing diode laser device has achieved this goal.

When several diode lasers are combined to form a more powerful beam, for example, for medical treatment or industrial welding, the diameter of the output spot, from the several lasers, inevitably specifies a certain minimum dimension. Using present day technology, it is thus easily achievable to focus 30 W of 808 nm or 980 nm diode generated power into a 600 μm output fiber core, having a numerical aperture, NA, of 0.37. While attempts are underway to achieve significantly >30 W power in the same focal spot, this task still presents a challenge for production manufacturing because of the difficulty in carrying a power density at that level. Moreover, ideally, 400 μm fibers or even 200 μm fibers are required for certain more delicate medical interventions. On the other hand with the large bulky classical laser systems, powers of 120 W of classical laser power can currently be focused into 600 μm fibers and 60 W can be focused into 400 μm fibers. Thus to take full advantage of diode lasers and to compete effectively with classical laser systems, there is a need for a diode based laser system capable of meeting these requirements or improving on them.

BRIEF SUMMARY OF THE INVENTION

It is an object of the present invention to address the need for a more accurate and efficient laser system by providing a diode laser system which is self-contained and compact, and which comprises a minimum of high cost materials.

It is another aim of the present invention to employ diode laser systems which make it possible to use optical delivery (treatment) fibers with differing diameters to deliver the power density level required for specific applications.

It is a further object of the present invention to bundle round or rectangular core optical fibers in concentric circles, in linear arrangements, or in step-shaped mirror configurations wherein each bundle is capable of delivering laser power of a given power level and power density level depending upon the number of the optical fibers.

A still further object of the present invention is to code by computer or otherwise the laser delivery system such that smaller diameter, treatment optical fibers are energized when the system is used under low power, so as to allow for a smaller focus of the output spot; and upon higher power demand, provided a suitably large treatment fiber is inserted, the outer ring of optical fibers are energized as well to control and focus a higher level of power into the larger treatment fiber.

A still further object of the present invention is to program the diode laser system to power up diodes so as to selectively optically connect to either outer and inner ring fiber bundles, projecting the required spot size to a delivery point, the treatment fiber or actual site, so as to even out the usage load of all diode lasers over an extended period of time thereby maximizing the lifetime of the system.

Another object of the invention is to achieve a similar result by the use of lenses, prisms or other optical components rather than fiber bundles.

Briefly stated, the present invention teaches a diode laser system which utilizes optical fibers arranged in bundles; whereby one group is bundled in a central section and one or more groups are arranged in a concentric circle, or other symmetrical shape or configuration around the central bundle. Variable power ranges and power densities are transmitted from the different groups as required for a particular medical or industrial application. The effect is to deliver a focused output of power density in the desired range. The diode laser system may also be programmed to utilize varying bundles of fibers for less than maximum power output so as to maximize the overall usable lifetime of the system.

BRIEF DESCRIPTION OF THE DRAWINGS

FIG. 1A illustrates one embodiment of the fiber bundle cross section of the invention, using standard round optical fibers. FIG. 1 provides schematically a system embodiment showing diode laser sources and treatment fiber.

FIG. 2 illustrates a bundle configuration of the present invention employing flat or rectangular core optical fibers. FIG. 2A illustrates a fiber cross section using a rectangular core fiber FIG. 3 illustrates an embodiment of the present invention used to pump a solid state slab like laser crystal.

FIG. 4 illustrates a bundle configuration and possible treatment optical fibers of the present invention employing rectangular core optical fibers as transmission fibers.

DETAILED DESCRIPTION OF PREFERRED EMBODIMENTS

In one embodiment, the diode laser emitters used in a Diode Laser System are subdivided into at least two groups. Group 1 emitters are optically connected to a first group of optical fibers and Group 2 emitters are optically connected to a second group of optical fibers. On the output end Group 1 fibers are bundled in the central section of a fiber optic connector and Group 2 fibers form a concentric annulus around them in the same connector. The laser delivery system can be coded or computerized on the connector side so as to indicate the diameter of the treatment fiber attached to the connector. Upon power demand, the laser system will energize only the inner ring (the Group 1 emitters) when a small diameter treatment fiber is connected. Alternatively both emitter groups are activated when a high power is requested and a treatment fiber of sufficiently large diameter has been attached to accept the image of the whole bundle (Group 1 and Group 2 fibers together). In case of a request for a relatively low power into a large fiber, the laser system can preferentially activate the diodes attached to the Group 2 fibers so as to even out the usage load over time over all diode laser emitters and thereby maximize the lifetime of the total system. A suitable software program can be used to perform this task.

As a matter of convention, the optical fibers used to deliver the combined output of several laser diodes will be called treatment fibers rather than delivery fibers, regardless of whether they are used in medical or industrial end uses.

The solution proposed by the subject invention, in one embodiment, employs optical fibers which are pigtailed to individual diode or diode arrays at one end, and arranged on the opposite end of the bundle in a concentric ring-like arrangement. The power controller is then programmed to activate only those diodes associated with the central ring up to its maximum power level and to increase from there to diodes associated with successive outer rings as higher powers are required. As a safety feature, computer-controlling the fiber diameters of the Multi-Diode Laser Delivery System to be used in a particular application, such as a medical procedure, would prevent the Laser System from launching too high powers resulting in launching radiation outside the fiber core. Similarly, the connectors of the treatment fibers can be coded and read by the laser system so as to automatically prevent damage by restricting launches of specific power density levels to a predetermined treatment fiber core diameter.

In most cases, the preferred embodiments of the invention consist of two types of fibers (1) Transmission fibers, which carry power from the diode laser to the delivery fibers; and (2) Delivery or Treatment fibers which carry power from the transmission fibers to the patient or other object. In some embodiments there is no need for a delivery/treatment fiber, the output of the transmission fibers can simply be focused with standard optical components, such as lenses, to a spot beyond the laser system, where ablation of tissue, welding of materials, etc. can be accomplished directly. The latter embodiments have the advantage of minimizing transmission loss between the laser source and the surface area to be treated. Their disadvantage lies in their sensitivity to the effects of the medium between the focusing optics and the treatment site.

For most embodiments the transmission fibers are all the same diameter. The treatment fibers change in diameter and usually are selected to be as small in diameter as possible while being able to accept the composite beam transmitted from the laser sources by the transmission fibers. The latter being arranged in a compact bundle at their ends opposite from the laser diode emitters, in order to achieve the highest possible power densities at the delivery/treatment site.

An example of a fiber bundle cross section, and of a multi-diode laser system incorporating such a bundle, is presented in FIG. 1. Fiber bundle 2 is shown in cross section in FIG. 1A, with central fibers 3 and perimeter fibers 5. In laser diode system 1, central fibers 3 are associated with diode laser emitters of first diode array 4 and perimeter fibers 5 are associated with a second diode laser array 6. The fiber cross section of FIG. 1A presents the detail of bundle end 8 whose output is imaged by imaging optics 18 onto laser treatment system fiber 10. When only center fibers 3 are used, their output can be projected by imaging optics 18 into a 400 $\mu$m core treatment fiber 10. When second diode array 6 is also operating, output of perimeter fibers 5, alone or in conjunction with the output of central fibers 3, is imaged by imaging optics 18 into a 600 $\mu$m core treatment fiber 10. The core diameter size and optical properties of the treatment fiber would define the power level and power density level obtained at application site 12. For safety, the computer controlling the output of the diode arrays could be programmed to require a specific minimum treatment fiber core diameters for specified distributions of output from the diode laser arrays. Alternatively, at connector 16 a design can be used that requires a coded signal reflecting a treatment fiber's core size in order that a specific power level or transmission fiber bundle spot size be allowed, i.e. a certain combination of diodes be activated.

During a medical procedure, for example, when a treatment fiber is used and a power lower than the maximum achievable level is required, the laser system can be programmed to select diodes at random (within the output spot size of the transmission fiber bundle) and preference may be given to use those associated with fibers in the outermost permissible rings, so that an even load or an even use of the diodes is achieved over the lifetime of the Diode Laser System.

It is recognized that in general, more delicate medical tasks such as root canal sterilization that require small diameter fibers (such as 200 $\mu$m) also require far lower power whereas the procedures requiring higher power, such as prostate treatments, can be done with treatment fibers, having cores ranging up to 1200 $\mu$m The large fiber diameters are used to attain stability and durability at the output end, and power levels of 100 W and beyond are used for prostate treatment.

Similarly in industrial applications, cutting through a material may require a much higher power density, i.e. higher focused, smaller treatment spot, than in a welding application.

Another embodiment of the invention employs diodes which are pigtailed by rectangular fibers or flat-surfaced fibers, which have non-circular cores. Wolfgang Neuberger, the inventor of the subject invention, and CeramOptec Industries, Assignee, are also the inventor and assignee respectively of U.S. Pat. No. 5,566,267 entitled, Flat Surfaced Fiber and Diode Laser Medical Devices which issued on Oct. 15, 1996 which is incorporated herein by reference and which teaches a diode laser delivery system with rectangular fibers in various configurations. The rectangular fibers permit the overall cross sectional area of the final delivery or treatment fiber to be smaller. Different shapes of the bundled fibers are also possible with these flat-surfaced fibers.

An embodiment with flat surfaced fibers is illustrated in FIG. 2. One embodiment of a fiber cross section using rectangular core fiber is displayed in FIG. 2A. Central fibers 23 here form an inner rectangular shape, which might be designed to overlap a standard optical fiber's round cross section as described in U.S. Pat. No. 5,566,267. Perimeter fibers 25 surround in some symmetrical way central fibers 23.

Another embodiment of this invented principle may employ classical optics to image the individual diodes or lasers in concentric circles (much similar to the fiber imaging system described above) and illuminate them following the same principles described. Here one or more lenses and other optical components are employed to capture a laser beam emitted by one or more laser diodes and to focus the beam at some common focal point at which either a treatment fiber would carry the high power density to a final site, or, alternatively, the treatment site is positioned at or near the focus spot formed by the transmission optical system.

In this example the transmission fibers discussed earlier are replaced by lenses or other optical components to transmit light emitted by a specific laser diode to a specific spot and spot size in space. As noted above, either a treatment fiber can be placed at this spot to deliver the power to a treatment site, or the treatment site itself may be placed at this spot. The invention in this embodiment involves selecting the optical components (lenses etc.), and then arranging them and the diode laser emitters so as to create concentric circles of increasing diameter as the number of diodes is increased, i.e. as the power level increases. This is done so as not to exceed the capacity of a required treatment fiber or to minimize side effects at a treatment site. Conceptually this is an equivalent to the use of transmission fibers whose output ends are arranged in concentric bundles.

Apart from medical laser system and applications, other uses of each or any of the embodiments would be industrial laser marking or diode laser pumping of solid state laser crystals. In industrial applications, saturation of the laser crystals can be achieved earlier and conversion efficiency is enhanced at lower total power, if the power density can be maintained at a high level. In this latter case, non-concentric, but still structured, arrangements of bundled fibers can achieve the task better than current approaches. With pumping of laser crystals, a significant overlap of the pump radiation with the generated mode volume of laser radiation is essential in the crystal. The area irradiated of a laser medium in general regulates the modal volume excited and thus modal output of the laser. If the laser crystal has a volume that is slab-like or rectangular, a linear arrangement of the bundled fibers may be preferable to a concentric circle, for example, as illustrated in FIG. 3.

In FIG. 3, central fibers 33 transmit power from a first diode laser array while outer fibers 35 transmit power from a second and third diode laser array. Central fibers 33 transmit pumping power to the center of laser crystal 37, while outer fibers 35 are used to activate a larger portion of crystal 37 so as to yield a higher total power output from crystal 37. Either or both groups of transmission fibers may be standard optical fibers or of the new flat surfaced core type. Their dimensions would be predicated on the dimensions of the solid state laser crystal slabs dimensions and the modal volume one desired to activate by the pumping energy.

An embodiment of the present invention using rectangular core fibers is illustrated in FIG. 4. Here there are 7 fibers 41 with rectangular cores in the center, and 16 fibers 43 with rectangular cores arranged in an outer ring. Because of the higher power density in the rectangular cores, the output from central fibers 41 can be focused into a 200 μm core optical fiber 45 of a medical laser delivery system, whereas the output of outer fibers 43 can be imaged on to a 400 μm core optical fiber 47 medical laser delivery system.

The examples presented here have other non-medical applications. These include laser bar code markings, welding of metals or plastics, and cutting fabric, metals or plastics. For example, transmission fibers may deliver laser markings in many optic shapes such as circular, linear or a step-shaped mirror configuration.

Having described the preferred embodiments of the invention with reference to the accompanying drawings, it is to be understood that the invention is not limited to these precise embodiments and that various changes and modifications may be effected therein by one skilled in the art without departing from the scope or spirit of the invention as defined in the appended claims.

What is claimed is:

1. A high power multi-diode laser system comprising:
   at least one multiple set of diode laser emitters;
   at least group 1 and group 2 of optical fibers, each group having transmission fibers which each accept energy from a diode laser emitter;
   said transmission fibers in a Group having uniform cross sectional areas;
   said transmission fibers being optically coupled to said diode laser emitters at one end and at a second end are arranged in a preselected pattern determined by transmission fiber shape and end use of said laser system;
   each group of transmission fibers being coupled with preselected diode lasers and having its second end geometrically arranged as required by a particular end use of said laser system; and
   each group of transmission fibers and their related diode laser emitters can be powered up independently so that an optimum power density is achieved at said second end of said transmission fibers even when less than all diode laser emitters are powered up.

2. A laser system according to claim 1, wherein all groups of transmission fibers have equivalent geometrical dimensions.

3. A laser system according to claim 1, wherein different groups of transmission fibers have different geometrical dimensions.

4. A laser system according to claim 1, further comprising:
   treatment fibers which accept energy from said transmission fibers and carry said energy to a treatment site; and
   said treatment fibers having diameters determined by end use of said laser system.

5. A laser system according to claim 4, wherein all groups of transmission fibers have equivalent geometrical dimensions.

6. A laser system according to claim 4, wherein different groups of transmission fibers have different geometrical dimensions.

7. A laser system according to claim 1, wherein said transmission fibers each have a core with a non-circular cross section.

8. A laser system according to claim 7, wherein said transmission fibers each have a core with a rectangular cross section.

9. A laser system according to claim 4, wherein said transmission fibers each have a core with a non-circular cross section.

10. A laser system according to claim 9, wherein said transmission fibers each have a core with a rectangular cross section.

11. A laser system according to claim 1, wherein Group 1 fibers are bundled in a central circle and each successive group forms a concentric circle around prior groups.

12. A laser system according to claim 4, wherein Group 1 fibers are bundled in a central circle and each successive group forms a concentric circle around prior groups.

13. A laser system according to claim 11, wherein output ends, said second ends, of said fiber optic groups are optically connected to one fiber optic connector.

14. A laser system according to claim 13, wherein said Group 1 fibers are connected to a central section of said fiber optic connector and each successive group is connected in a concentric annulus around prior groups.

15. A laser system according to claim 14, wherein said fiber optic connector contains means of coding so as to indicate to the operator the diameter of treatment fiber and thus a maximum level of power that can be delivered.

16. A laser system according to claim 15, wherein said system powers up said groups of fibers necessary to meet power demand of a particular end use, so that Group 1 fibers are powered up to power levels within a known capacity of Group 1 then, for higher powers Group 1 fibers and Group 2 fibers are powered up and further to reach still higher power levels, subsequent groups, in order, necessary to reach a required power level are also powered up.

17. A laser system according to claim 14 combined with computer software programmed to preferentially power up portions of said fiber optic groups, whereby for instances in which the power demand falls below the maximum power capacity of the groups powered up, the program will preferentially power up portions of the groups so as to maximize the overall usable lifetime of the system.

18. A high power multi-diode laser system comprising:
   at least one multiple set of diode laser emitters;
   at least two sets of lenses, prisms, or other optical elements to transmit energy from said at least one multiple set of diode laser emitters to a site where a treatment is to be effected;
   said lenses, prisms, other optical elements being optically coupled to said diode laser emitters and projecting said energy in a preselected pattern determined by a preselected end use of said laser system;
   each set of lenses, prisms, other optical elements being coupled with preselected diode lasers; and
   each set of lenses, prisms, other optical elements and their related diode laser emitters can be powered up independently so that an optimum power density is achieved when said energy is projected in said preselected pattern even when less than all diode laser emitters are powered up.

19. A laser system according to claim 18, further comprising:
   treatment fibers which accept energy from said sets of lenses, prisms, other optical elements and carry said energy to a treatment site; and
   said treatment fibers having diameters determined by end use of said laser system.

* * * * *